United States Patent

Mack

[11] Patent Number: 6,129,363
[45] Date of Patent: Oct. 10, 2000

[54] DRILL CHUCK WITH PLASTIC CHUCK BODY

[75] Inventor: Hans-Dieter Mack, Sontheim, Germany

[73] Assignee: Rohm GmbH, Sontheim, Germany

[21] Appl. No.: 09/226,456

[22] Filed: Jan. 6, 1999

[30] Foreign Application Priority Data

Jan. 14, 1998 [DE] Germany ............................ 198 00 999
Jul. 4, 1998 [DE] Germany ............................ 198 29 931

[51] Int. Cl.$^7$ ............................................ B23B 31/12
[52] U.S. Cl. .......................... 279/62; 279/60; 279/63; 279/902; 279/158; 403/355; 403/383; 411/438; 524/494
[58] Field of Search .................. 279/60–65, 902, 279/158; 403/355, 383; 411/438; 524/494

[56] References Cited

U.S. PATENT DOCUMENTS

| | | | |
|---|---|---|---|
| 2,439,687 | 4/1948 | Findley | 411/438 |
| 3,325,166 | 6/1967 | McCarthy | 279/63 |
| 3,360,285 | 12/1967 | Huckshold | 403/355 |
| 3,685,843 | 8/1972 | Jacyno | 279/158 |
| 3,910,589 | 10/1975 | Derbyshire | 279/61 |
| 3,945,070 | 3/1976 | Hauser | 411/438 |
| 4,170,366 | 10/1979 | Allessio | 279/62 |
| 4,339,374 | 7/1982 | Olschewski et al. | 524/494 |
| 4,995,444 | 2/1991 | Jolly et al. | 164/97 |
| 5,108,678 | 4/1992 | Hirasaka et al. | 264/113 |
| 5,145,904 | 9/1992 | Muehlbach et al. | 524/494 |
| 5,171,030 | 12/1992 | Rohm | 279/63 |
| 5,215,317 | 6/1993 | Jordan et al. | 279/63 |
| 5,219,174 | 6/1993 | Zurbrugg et al. | 279/158 |
| 5,236,206 | 8/1993 | Rohm | |
| 5,390,940 | 2/1995 | Morlino et al. | 279/902 |
| 5,476,273 | 12/1995 | Shadeck et al. | 279/60 |
| 5,580,197 | 12/1996 | Rohm | 279/61 |
| 5,816,583 | 10/1998 | Middleton | 279/62 |
| 5,918,887 | 7/1999 | Miles | 279/158 |

FOREIGN PATENT DOCUMENTS

| | | | |
|---|---|---|---|
| 732276 | 2/1943 | Germany | 279/62 |
| 34 37 792 | 1/1986 | Germany . | |

*Primary Examiner*—Steven C. Bishop
*Attorney, Agent, or Firm*—Herbert Dubno; Andrew Wilford

[57] ABSTRACT

A drill chuck has a body element formed of fiber-reinforced plastic, centered on and rotatable about an axis, and formed centered on the axis with a rearwardly open spindle hole and a forwardly open tool hole. A ring element is axially fixed but rotatable about the axis on the body element and one of the elements is formed with a plurality of angled guide passages opening axially forward into the tool hole and the other of the elements is formed centered on the axis with a screwthread exposed in the passages. Respective jaws axially and radially displaceable in the passages are each formed with a row of teeth meshing with the screwthread so that rotation of the ring element in one direction displaces the jaws toward one another and opposite rotation displaces them away from one another.

26 Claims, 21 Drawing Sheets

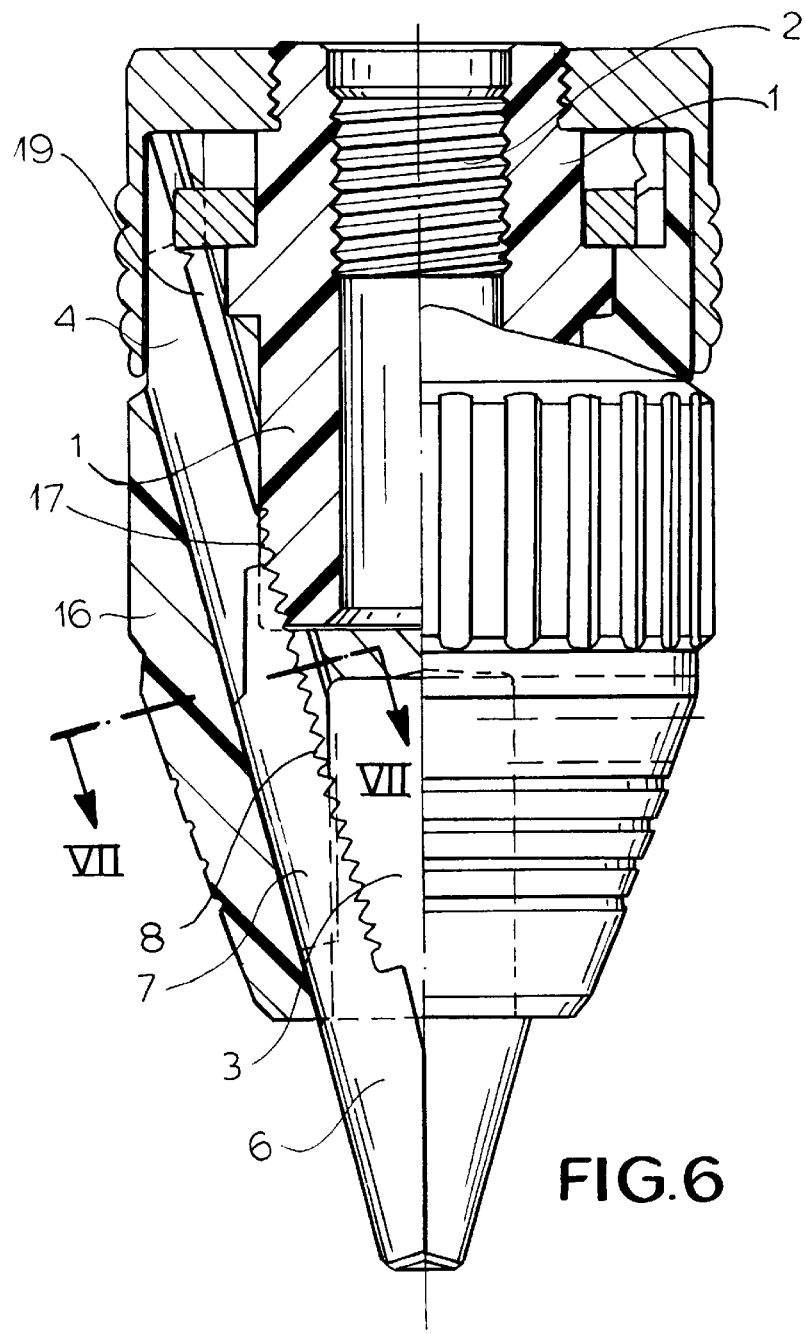
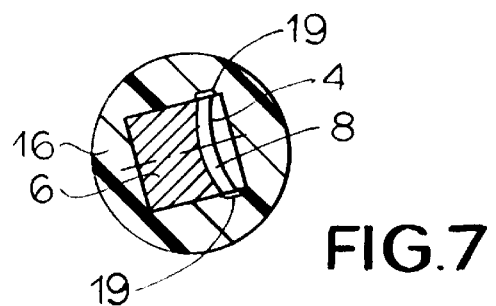

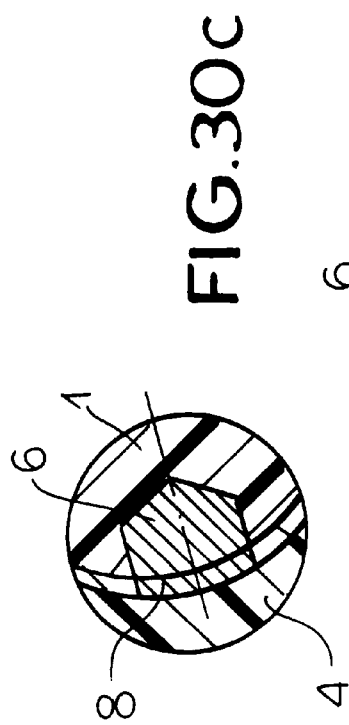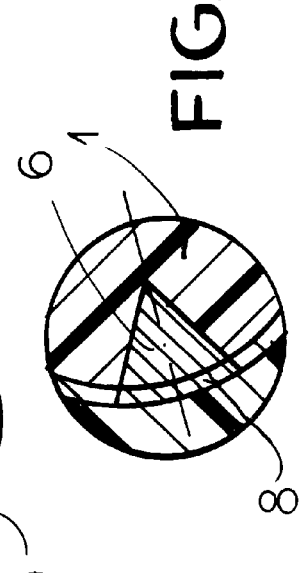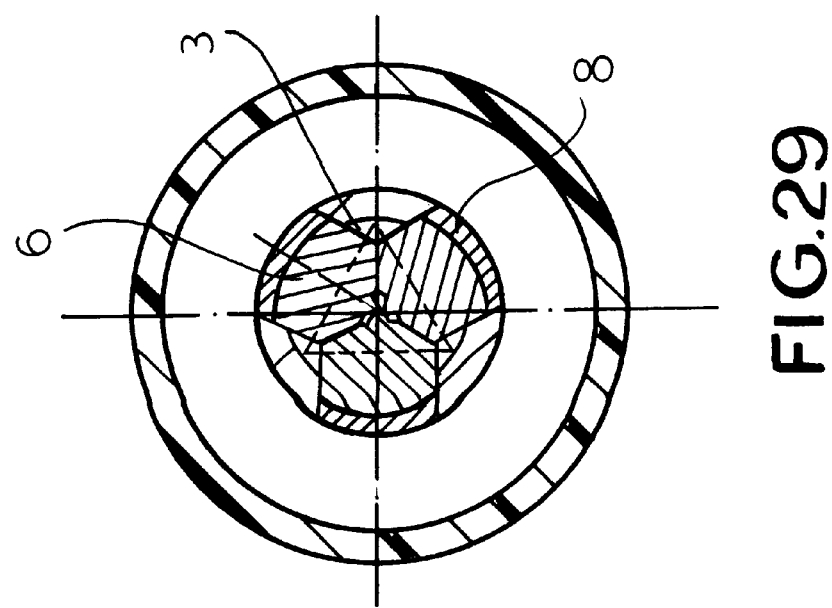

DRILL CHUCK WITH PLASTIC CHUCK BODY

FIELD OF THE INVENTION

The present invention relates to a chuck. More particularly this invention concerns a drill chuck.

BACKGROUND OF THE INVENTION

A standard drill chuck has a body element centered on and rotatable about an axis and formed centered on the axis with a rearwardly open spindle hole and a forwardly open tool hole. A ring element is axially fixed but rotatable about the axis on the body element. One of the elements is formed with a plurality of angled guide passages opening axially forward into the tool hole and the other of the elements is formed centered on the axis with a screwthread exposed in the passages. Respective jaws axially and radially displaceable in the passages are each formed with a row of teeth meshing with the screwthread so that rotation of the ring element in one direction displaces the jaws toward one another and opposite rotation displaces them away from one another.

German patent 3,437,792 of G. H. Rohm describes such a system where the actual tool-engaging jaws ride on angled surfaces of the chuck body and are pushed along them by actuating elements that only move axially in the chuck body. The ring element is formed with the screwthread and can be rotated by means of a key.

So-called keyless systems are known from commonly owned U.S. Pat. Nos. 5,236,206 and 5,829,761 which have a knurled sleeve either itself formed with the guide passages or connected to the ring. They are very convenient to use, eliminating the need for a separate key to open and close the chuck.

In all such systems the structure of the chuck body at least is expensive to manufacture. It is invariably made of steel and must be machined in several different stages so that the various holes and passages all have the proper dimensions. The passages must be drilled out so that jaws with round shafts are used, creating a problem of the jaws wanting to rotate in the passages when torsionally stressed during a drilling operation.

OBJECTS OF THE INVENTION

It is therefore an object of the present invention to provide an improved drill chuck.

Another object is the provision of such an improved drill chuck which overcomes the above-given disadvantages, that is which is easier and hence less expensive to manufacture than the prior-art such chucks.

SUMMARY OF THE INVENTION

A drill chuck has according to the invention a body element formed of fiber-reinforced plastic, centered on and rotatable about an axis, and formed centered on the axis with a rearwardly open spindle hole and a forwardly open tool hole. A ring element is axially fixed but rotatable about the axis on the body element and one of the elements is formed with a plurality of angled guide passages opening axially forward into the tool hole and the other of the elements is formed centered on the axis with a screwthread exposed in the passages. Respective jaws axially and radially displaceable in the passages are each formed with a row of teeth meshing with the screwthread so that rotation of the ring element in one direction displaces the jaws toward one another and opposite rotation displaces them away from one another.

Thus the core of the chuck, which is complexly shaped, is made of plastic which can easily be molded to virtually any desired shape. The remaining parts, which are typically bodies of revolution or of otherwise relatively simple shape, can be made of metal as they can be produced at low cost. Thus instead of producing a rough casting and then having to machine it in several stages, normally including lathing and boring, it is possible to produce the finished chuck body to relatively tight tolerances right out of the mold. Today's fiber-reinforced resins are particularly strong and can easily withstand the loads of a standard drill chuck.

According to the invention the plastic is reinforced with glass and/or carbon fibers. The glass-fiber content is between 5% and 35% and the carbon-fiber content is between 5% and 25%. More reinforcement is used in a professional-grade heavy-duty chuck than in a light duty precision drill. Furthermore the fibers are nonuniformly distributed in the plastic so that points of greatest stress are most heavily reinforced. In fact the fibers can be kept out of any parts of the chuck that might need subsequent machining, and concentrated in those regions, such as the tip, subjected to great stress.

The ring element in accordance with the invention can also be formed of fiber-reinforced plastic with the guide passages. The screwthread is formed on the body in this case.

Each of the guide passages can be formed with a longitudinally extending inwardly projecting ridge and each of the jaws is formed with a complementary groove. Alternately each of the guide passages can be formed with a longitudinally extending chip-draining groove. In this latter case the chuck body is formed at a base of the tool hole with an annular chip-catching groove communicating with the chip-draining grooves of the passages. Thus any chips that get in to the tool hole can move back out of the chuck.

Furthermore in accordance with the invention the passages and jaws are of complementary noncircular cross section, typically of complementary polygonal cross section. Such a section completely eliminates the possibility of the jaws rotating in their passages, and the teeth coming out of mesh with the screwthread, and producing such a section is no problem in a molded plastic part. In this case the teeth can be formed at a corner of the respective jaw and have a width smaller than a maximum width of the respective jaw. The jaws can even be themselves made of fiber-reinforced plastic. In any case the teeth are stamped into the respective jaws so that material is pressed from faces of the jaws at ends of the teeth. The passages are formed with longitudinal inwardly open grooves accommodating the material pressed from the respective jaws. This greatly simplifies manufacture of the chuck.

The spindle hole can be of polygonal section. In this case the chuck body is formed with a crosswise passage traversing the spindle hole. A pin received in the crosswise passage anchors a spindle in the spindle hole.

The chuck body according to the invention is formed with a radially outwardly open groove receiving the ring and having a flank provided with formations inhibiting rotation of the ring in one direction. In addition the body is provided with an imbedded metallic, normally steel, reinforcement element. This element can be a sleeve lining the spindle hole. Furthermore the element can have a flange forming a back flank of the groove. It is also possible for the element to have a portion forming a base of the tool hole. In another arrangement the sleeve has an axially extending skirt projecting axially forward and largely surrounding the body.

In accordance with the invention a spiral metal wire is imbedded in and reinforces the screwthread. This wire is exposed at flanks of the screwthread and can in fact have flat sides forming the flanks of the screwthread.

The body is formed with the passages and with a key-anchor hole and the ring is formed with teeth adapted to mesh with a gear of a key inserted in the key-anchor hole. The body is provided with an embedded metallic reinforcement at the key-anchor hole. Furthermore a metallic jacket cam closely surround a front end of the body and reinforce it at the key hole.

The ring element according to the invention can also be formed of fiber-reinforced plastic and formed with the passages and with a forwardly directed elastically deflectable lip. The body in this case has a shoulder engageable through and forward of the lip to retain the element on the body. The passages are formed in the plastic of the body and the body is provided with a metallic cover sleeve radially outwardly closing the passages.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 6 is an axial section through a fourth embodiment of the chuck;

FIG. 7 is a detail view taken along line VII—VII of FIG. 6;

FIG. 29 is a section taken along line XXIX—XXIX of FIG. 28;

FIG. 30a is a large-scale view of the detail indicated at section line XXX—XXX of FIG. 29;

FIGS. 30b and 30c are views like FIG. 30a showing variants on that structure;

SPECIFIC DESCRIPTION

Figure 1:
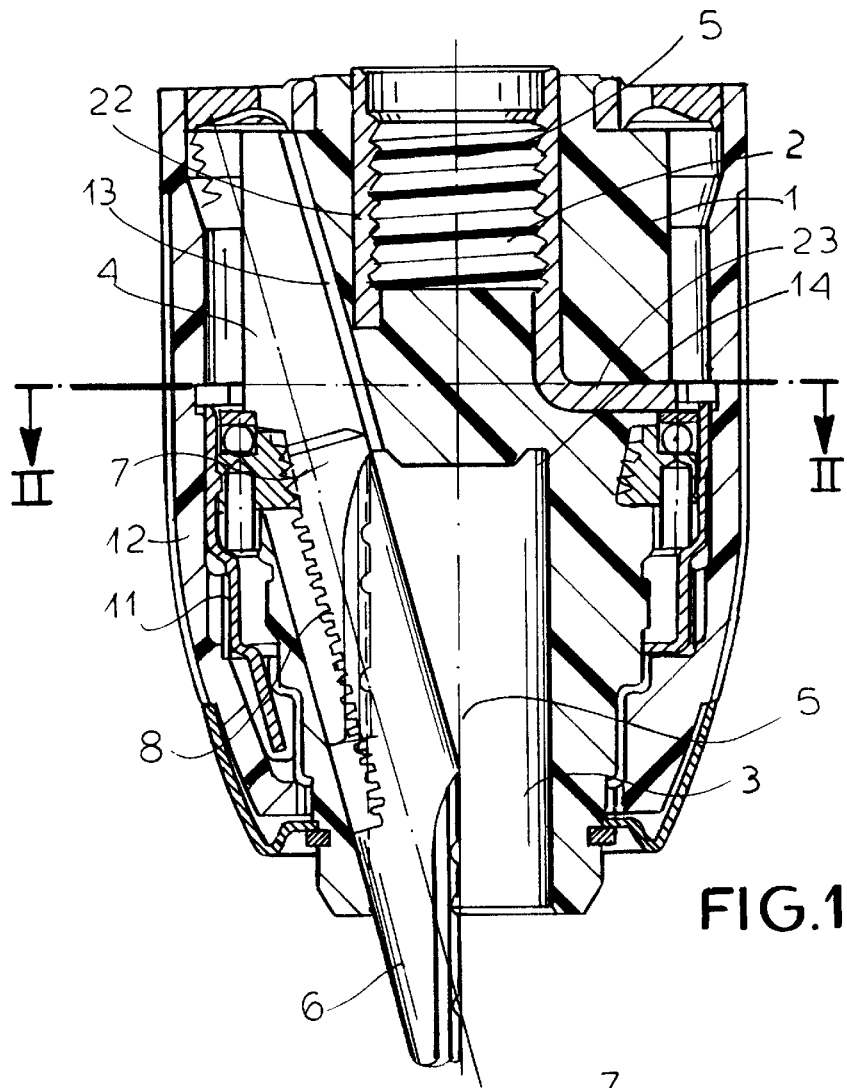
FIG. 1 is an axial section through a first embodiment of a chuck according to the invention
Figure 2:
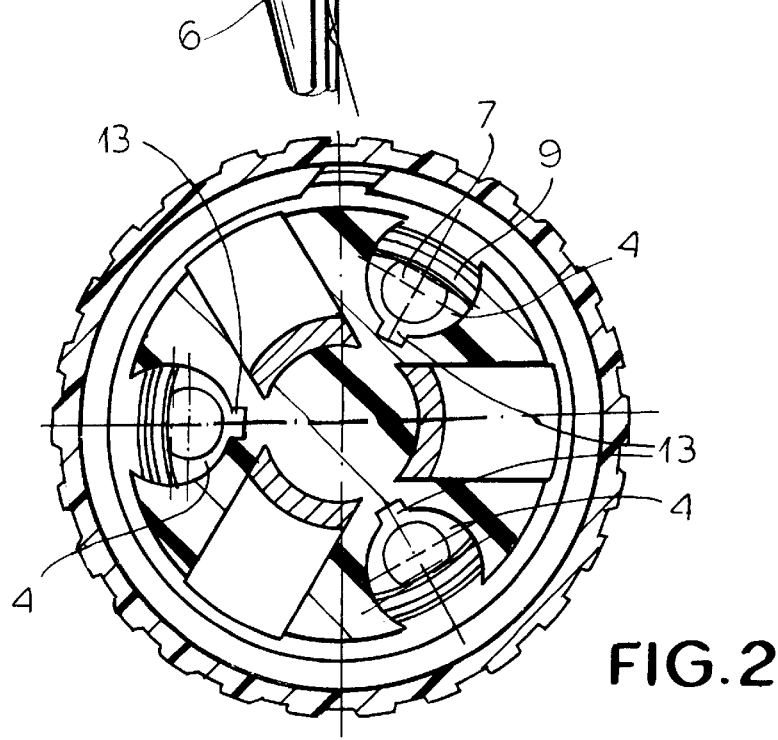
FIG. 2 is a section taken along line II—II of FIG. 1.

As seen in FIGS. 1 and 2 a chuck according to the invention has a fiber-reinforced plastic body 1 formed with a rearwardly open spindle-receiving hole 2 and a forwardly open tool hole 3 both centered on an axis 5. The body 1 is also formed with three angled guide passages 4 each receiving a respective metal jaw 6 having a shank 7 formed with radially outwardly directed teeth 8 meshing with an internal screwthread of a tightening ring 9 rotatable about the axis 5 in a radially outwardly open slot 10 formed in the body 1. As is standard, rotation of the ring 9 in one direction moves the jaws 6 axially forward and radially together to clamp a tool engaged in the hole 3 and opposite rotation moves them axially back and radially apart to unclamp the tool. A stepped metal sleeve 11 fixed to the ring 9 couples it to a full-length outside sleeve 12 that can also be made of plastic, so that this chuck can be tightened and loosened by hand, that is without the use of a chuck key.

The body 1 is made of a durable polyamide and is reinforced with glass and/or carbon fibers whose distribution can be concentrated at regions of great stress, such as the front end. In the illustrated embodiment the body 1 has 20% glass fibers and 10% carbon fibers. Normally the glass-fiber content ranges between 5% and 35%, preferably between 10% and 25%, and the carbon-fiber content between 5% and 25%, preferably between 5% and 15%.

A particular advantage of using plastic for the chuck body 1 is that it can have a more complex shape than is possible with a metal body which must be machined. Thus as shown in FIG. 2 the guide passages 7 are each formed with a full-length inwardly open square-section groove 13. These grooves 13 all open into an annular axially forwardly open groove 14 formed in the base of the hole 3. Thus small chips that get into the hole 3 during a drilling operation will be able to move out through the grooves 14 and 13 to clear the chuck.

FIG. 1 also shows how imbedded in the rear end of the chuck as a liner to the hole 2 is a metal sleeve 22 having radially extending flanges or fingers 23 that brace the rear flank of the groove 10 holding the ring 9. Thus the unillustrated spindle can be threaded into a metal part, not into the plastic of the body 1.

Figure 3:
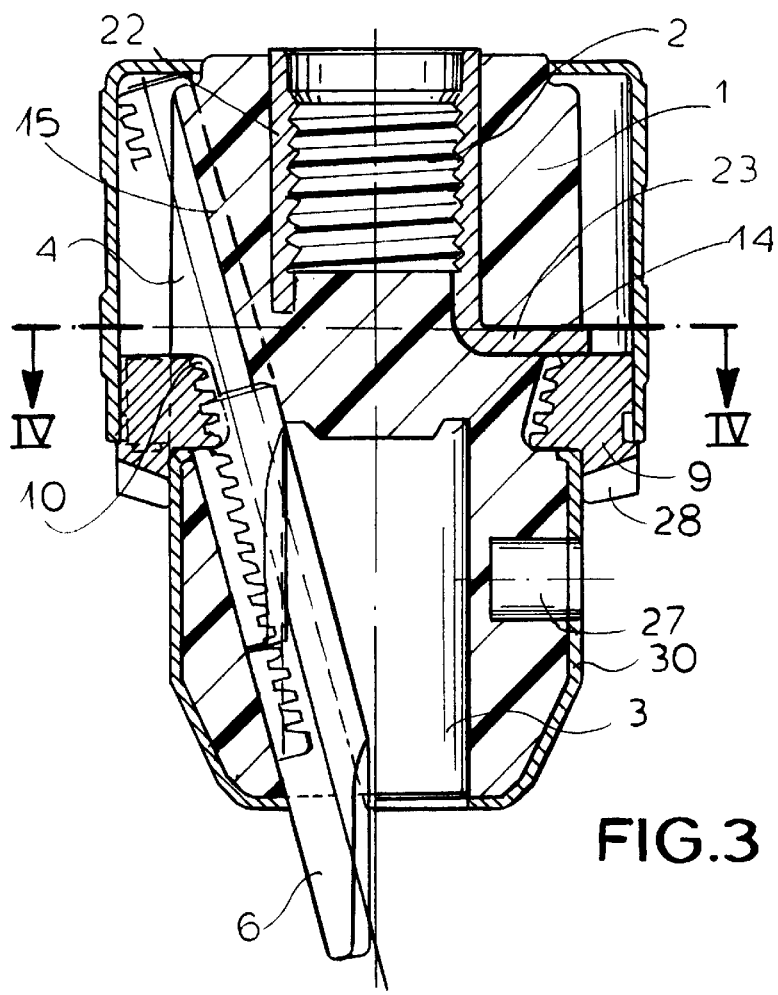
FIG. 3 is an axial section through a second embodiment of the chuck.
Figure 4:
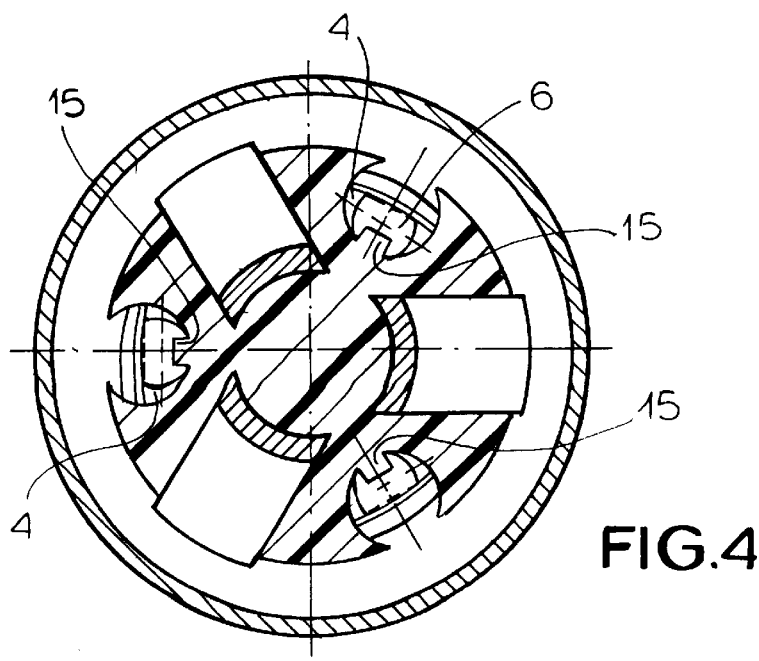
FIG. 4 is a section taken along line IV—IV of FIG. 3.

In FIGS. 3 and 4 the fingers 23 directly engage the rear side of the ring 9. In addition here the back walls of the passages 4 are each formed with a radially inwardly projecting ridge 15 that engages in a complementary groove formed in the back edge of the respective jaw 6. Thus the jaws 6 are effectively prevented from rotating in the passages 4. This chuck is set up for operation by a key inserted into a hole 27 and meshing with teeth 28 formed on the edge of the ring 9. The front end of the body 1 is closely contained in a metal jacket 30 that reinforces the edge of the key hole 27 and that strengthens this critical part of the structure.

Figure 5:
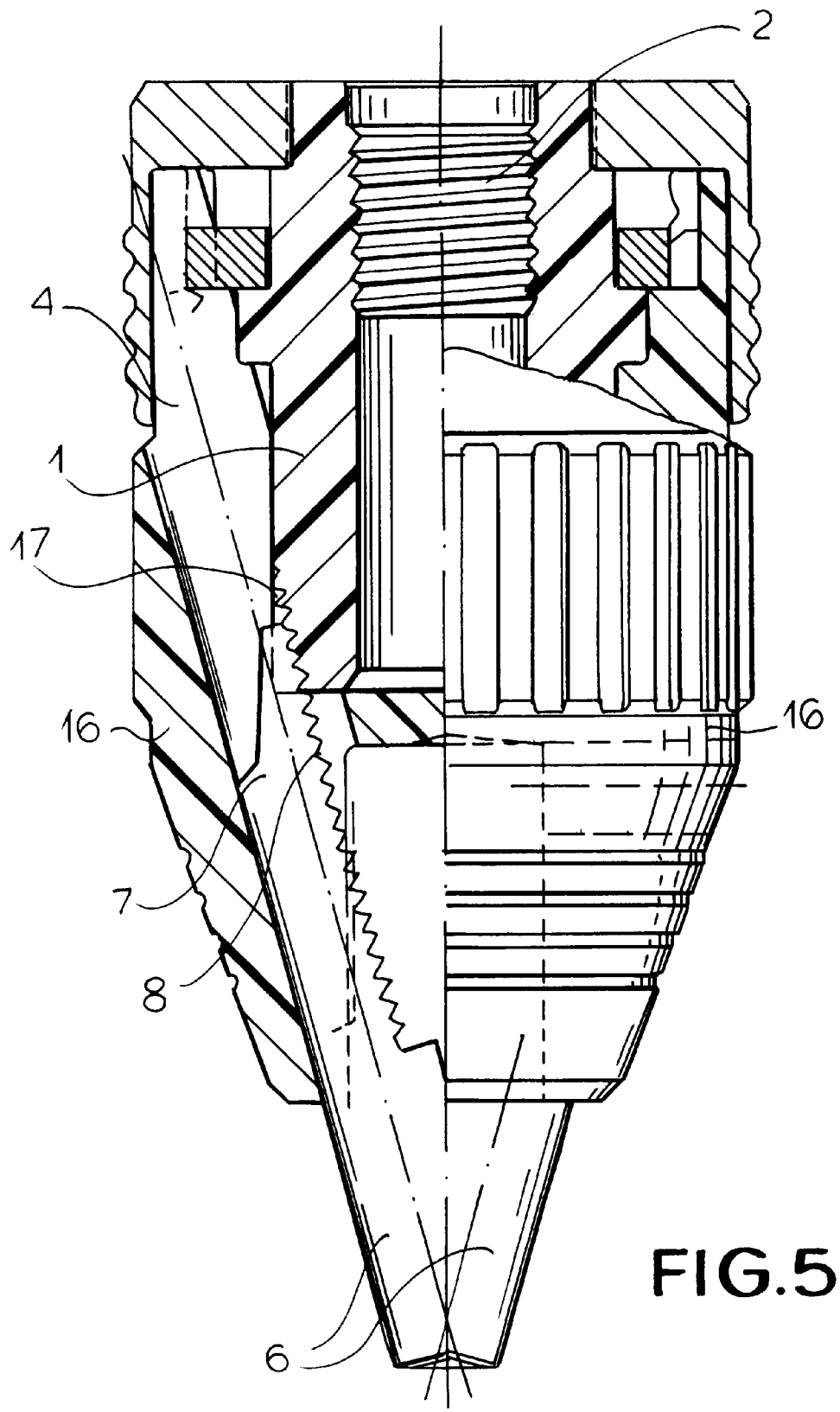
FIG. 5 is an axial section through a third embodiment of the chuck.

FIG. 5 shows a structure where the passages 4 are formed in a separate sleeve 16 rotatable on the body 1 which itself is formed with teeth 17 meshing with the teeth 8 of the jaws 6. This sleeve 16 therefore replaces the ring 9 and, like it, is rotatable but axially fixed on the body 1.

FIGS. 6 and 7 shows a system like that of FIG. 5 but where the passages 4 are of square section, as are the jaws 6. The teeth 8 are cut in one flat face of the square-section jaws 6 and may be stamped therefrom. The sides of the passage 4 are formed level with the edges of the teeth 8 with inwardly open grooves 19. Thus any material pushed out by the tooth-stamping operation will be accommodated in these grooves 19 and will not have to be machined off.

Figure 8:
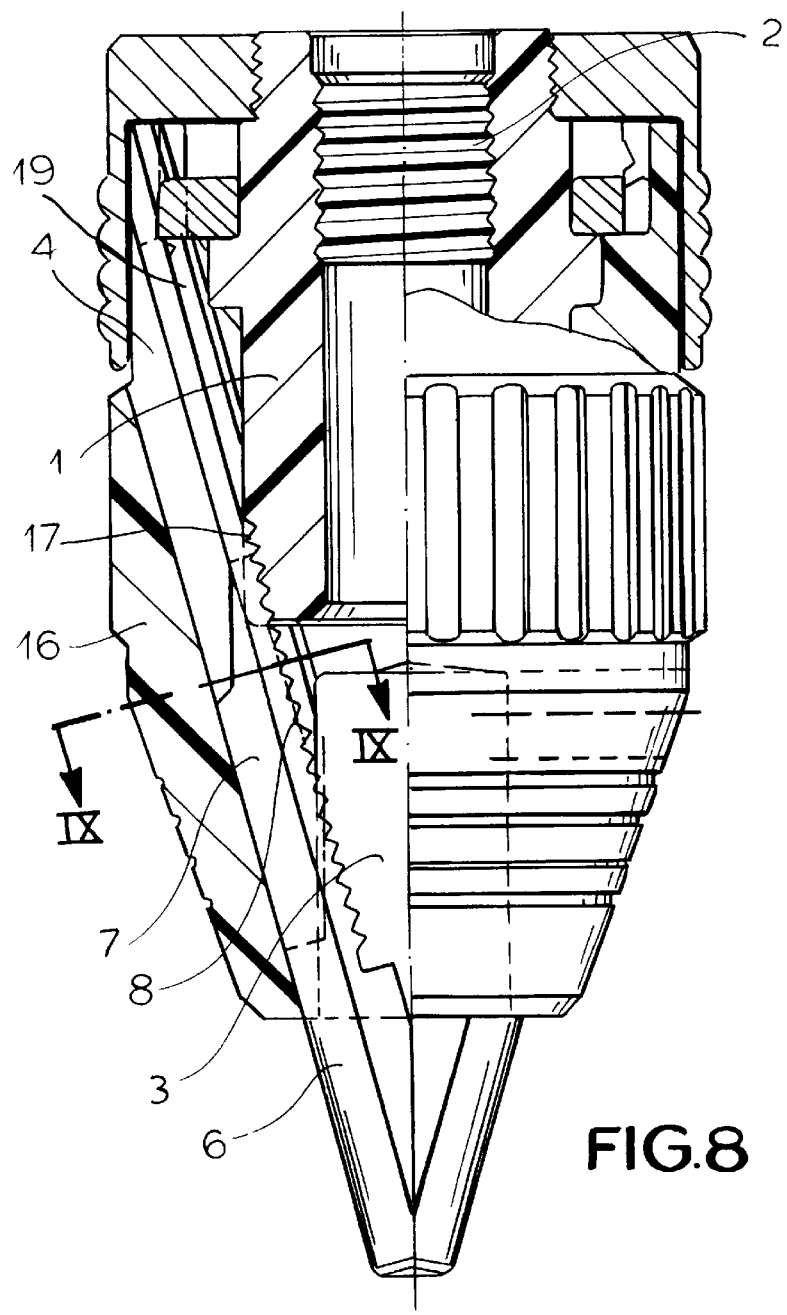
FIG. 8 is an axial section through a fifth embodiment of the chuck.
Figure 9:
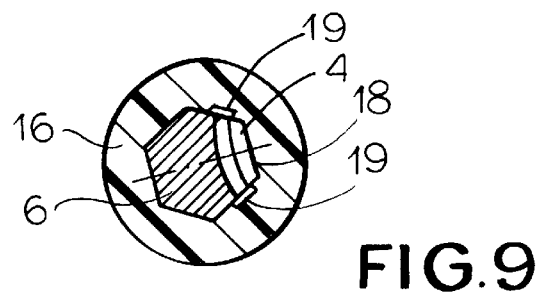
FIG. 9 is a detail view taken along line IX—IX of FIG. 8.

The system of FIGS. 8 and 9 is identical to that of FIGS. 6 and 7 except that the passages 4 and jaws 6 are of hexagonal section, with six flat sides 18.

Figure 10:
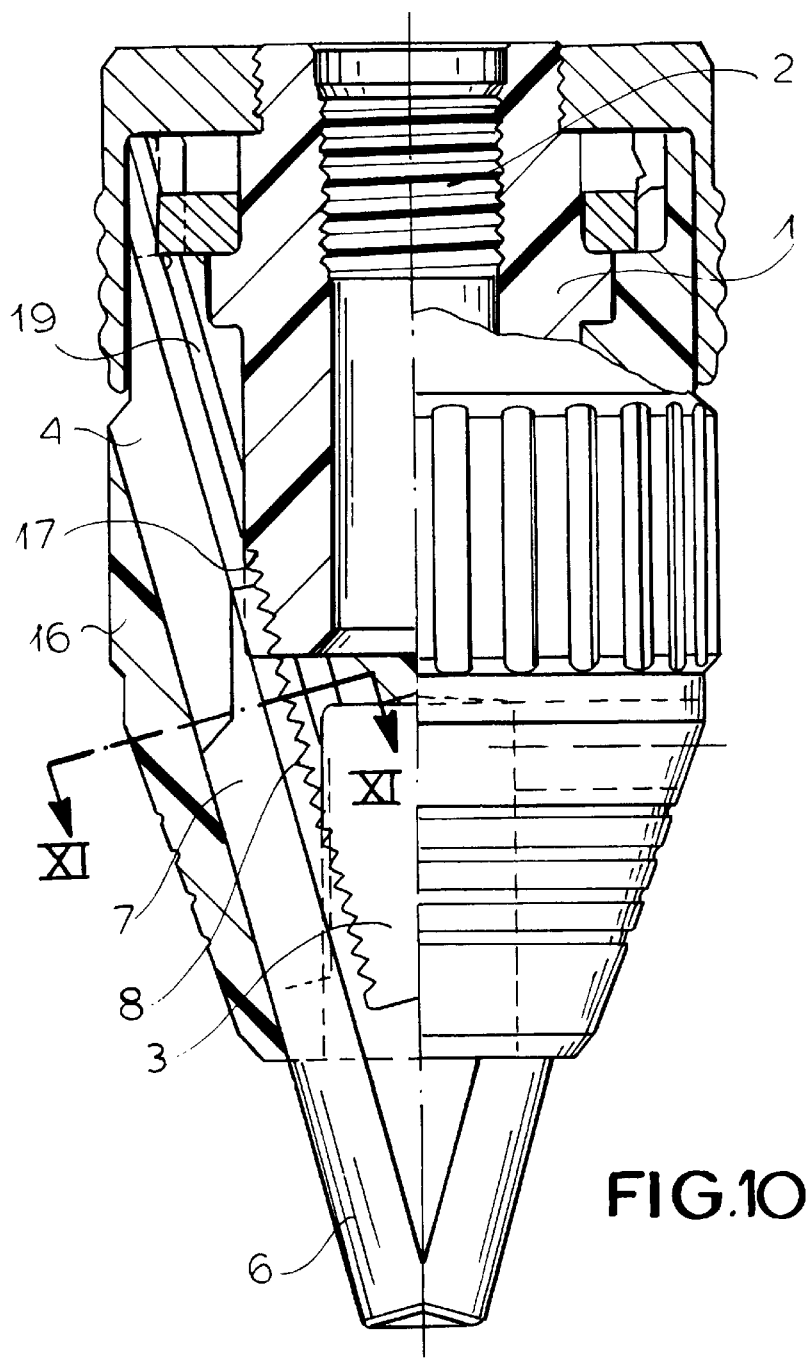
FIG. 10 is an axial section through a sixth embodiment of the chuck.
Figure 11:
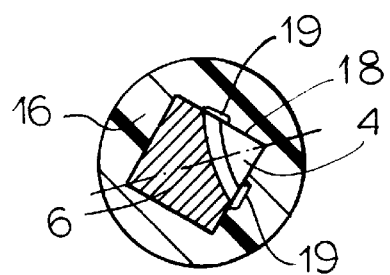
FIG. 11 is a detail view taken along line XI—XI of FIG. 10.

Square-section jaws 6 and passages 4 are used in FIGS. 10 and 11, but here the teeth 8 are cut on the corner, so that the relief grooves 19 are cut in adjacent flat sides 18 of the passages 4.

Figure 12:
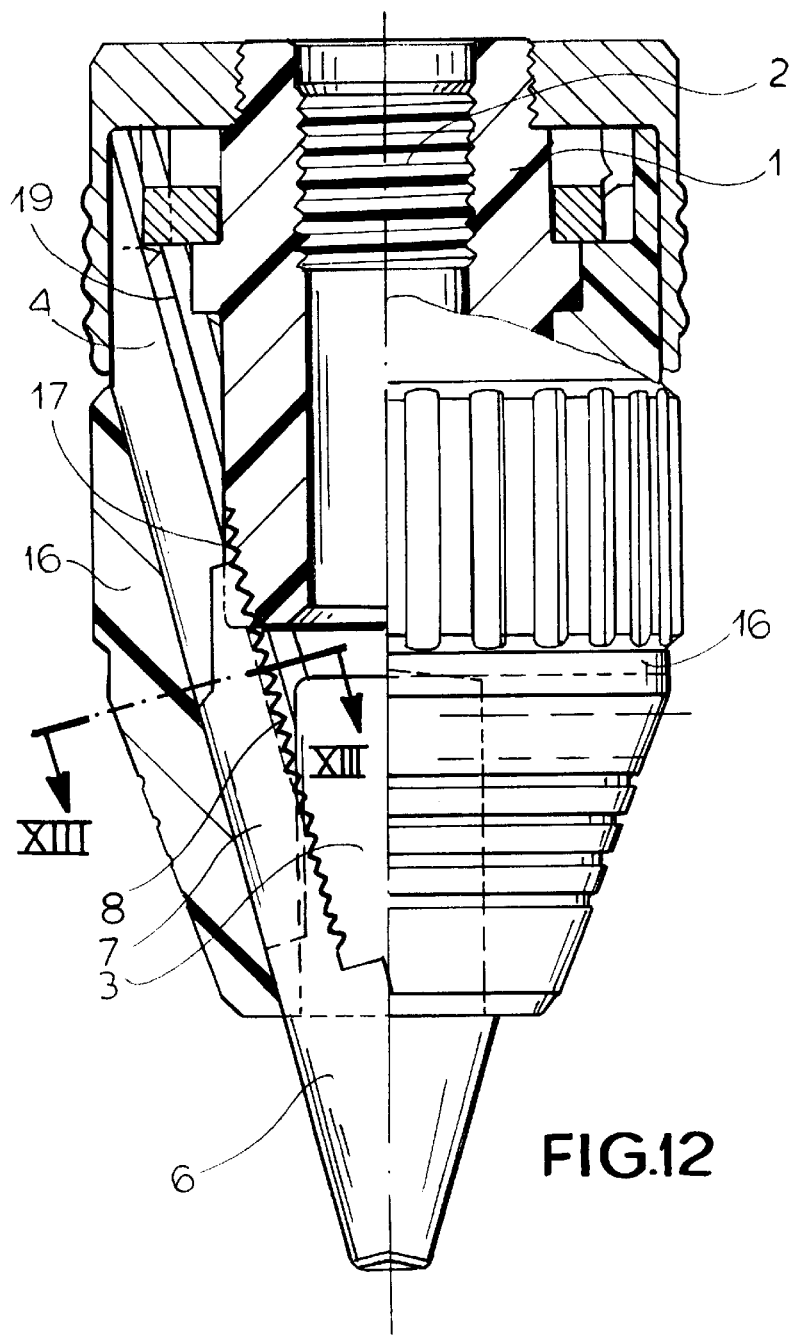
FIG. 12 is an axial section through a seventh embodiment of the chuck.
Figure 13:
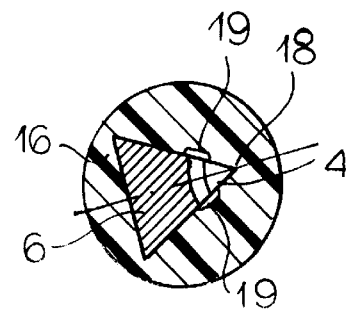
FIG. 13 is a detail view taken along line XIII—XIII of FIG. 12.

Similarly in FIGS. 12 and 13 the passages 4 and jaws 6 are of triangular section with the teeth 8 cut into the corner. This system is particularly advantageous since the acute angle formed between the sides the teeth 8 extend between inherently make the teeth 8 very short, so they can easily be produced by stamping rather than by machining. The cost of manufacture is thus reduced.

Figure 14:
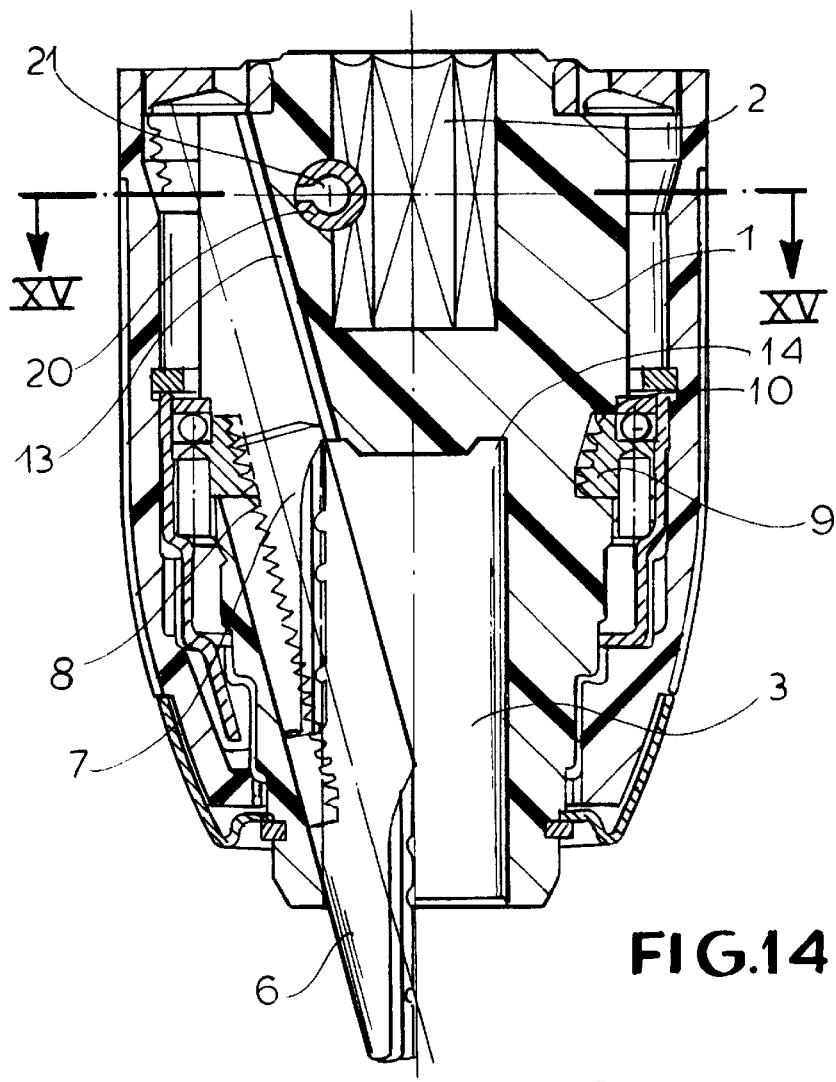
FIG. 14 is an axial section through an eighth embodiment of the chuck.
Figure 15:
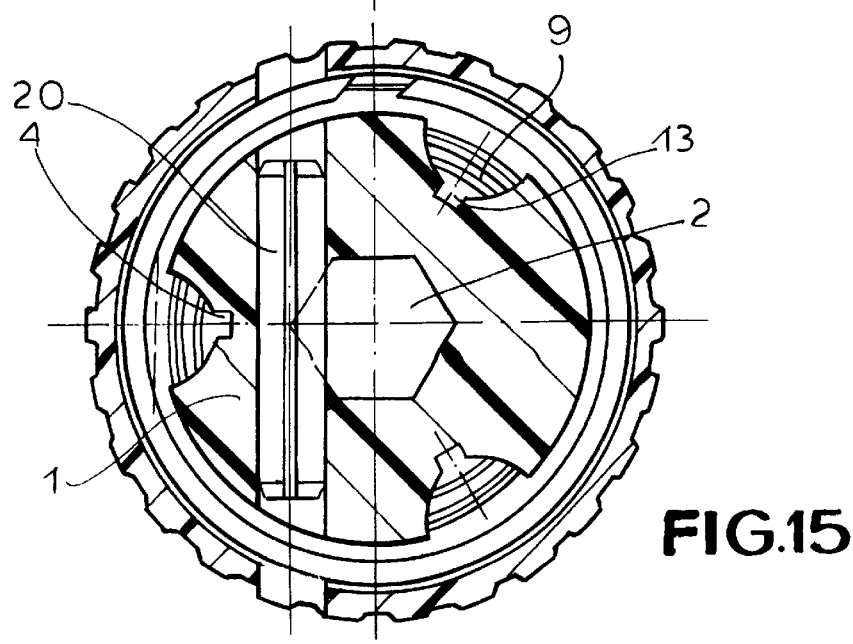
FIG. 15 is a detail view taken along line XV—XV of FIG. 14.

The chuck of FIGS. 14 and 15 has a hexagonal-section spindle hole 2. In addition the body 1 is formed with a crosswise passage 21 into which fits a roll pin 21 that projects into the hole 2 so as to link the unillustrated spindle with the chuck body 1. To this end, of course, the unillustrated spindle is formed with a crosswise groove that fits with the pin 21 to solidly axially couple it to the chuck body 1.

Figure 16:
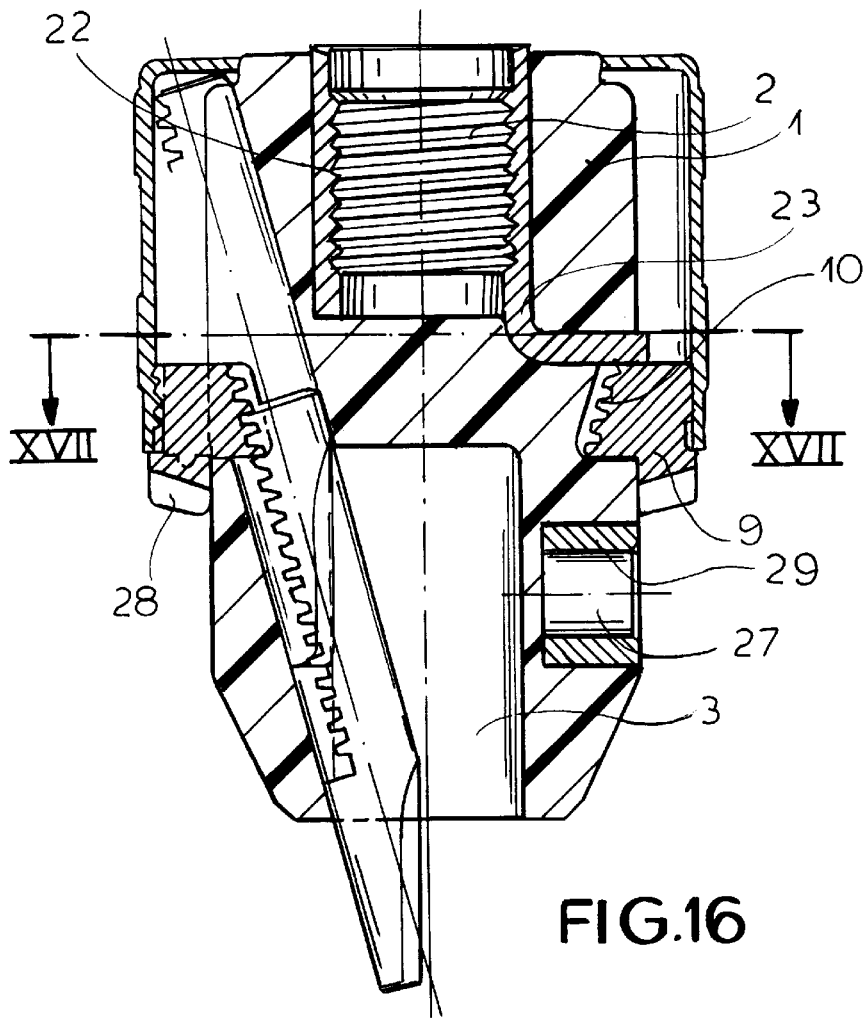
FIG. 16 is an axial section through a ninth embodiment of the chuck.
Figure 17:
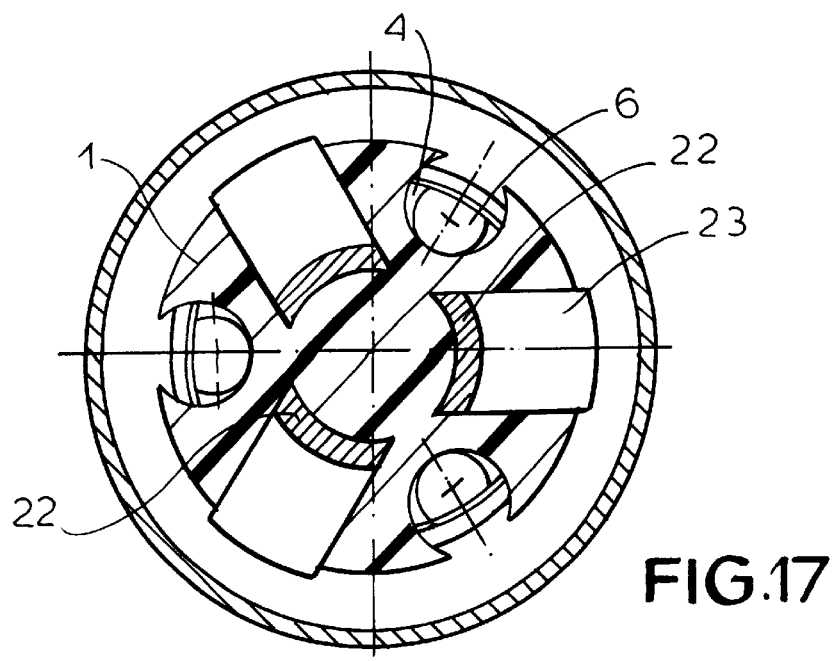
FIG. 17 is a detail view taken along line XVII—XVII of FIG. 16.

In FIGS. 16 and 17 the chuck is similar to that of FIGS. 3 and 4 except that the body 1 is provided with a cylindrically tubular liner 29 for the key hole 27.

Figure 18:
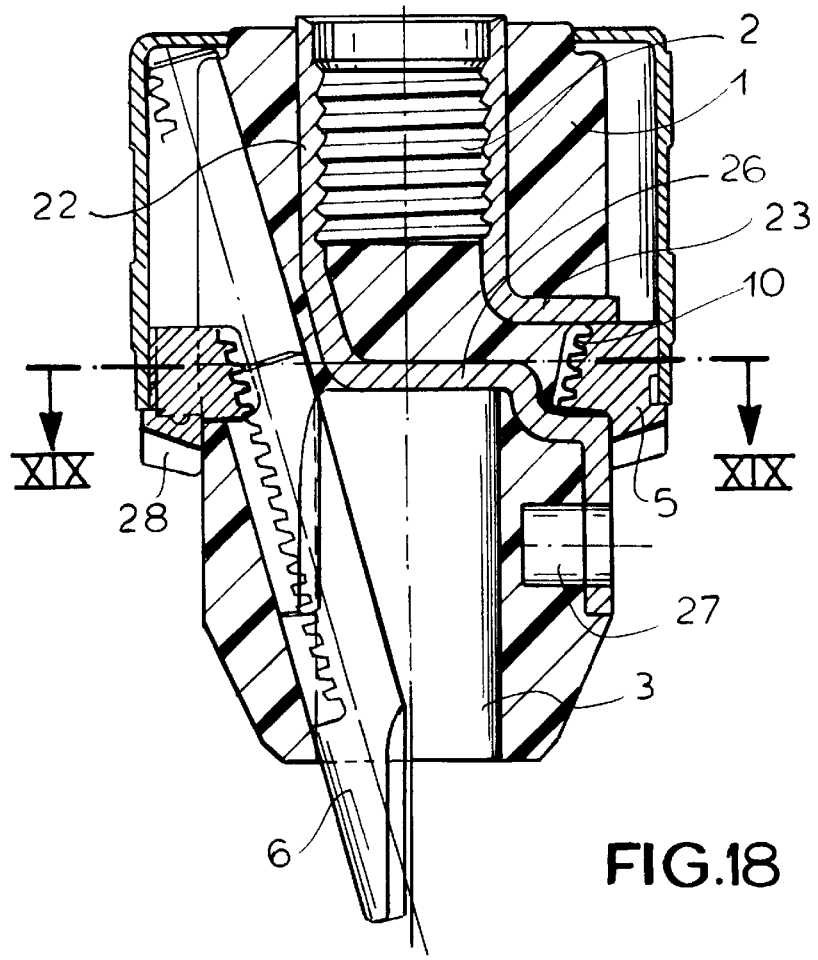
FIG. 18 is an axial section through a tenth embodiment of the chuck.
Figure 19:
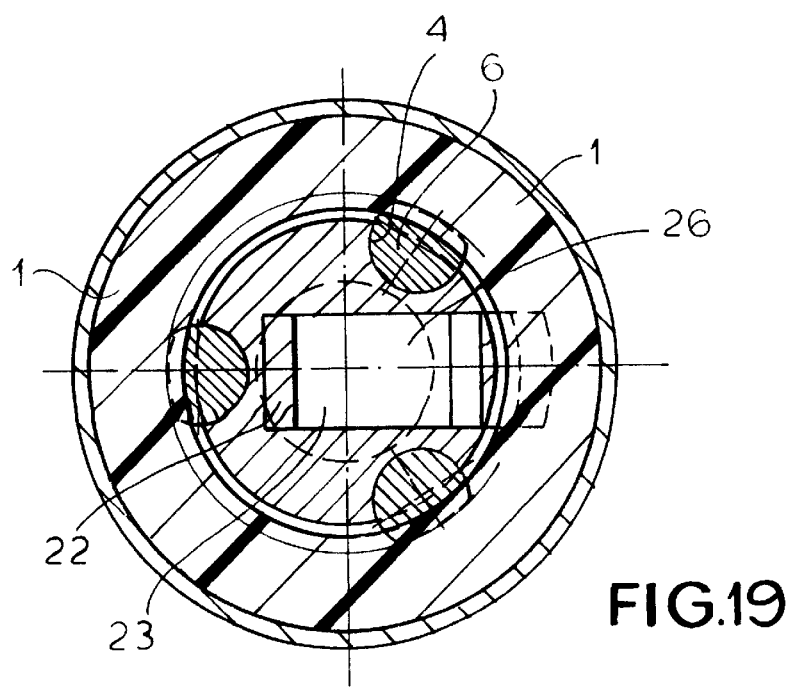
FIG. 19 is a detail view taken along line XIX—XIX of FIG. 18.

In the system of FIGS. 18 and 19 the metal reinforcement element 22 is extended down around the hole 27 so that it itself reinforces this hole 27. It also has a part 26 exposed at the base of the hole 3 so that a tool therein will not come into direct contact with the plastic of the body 1.

Figure 20:
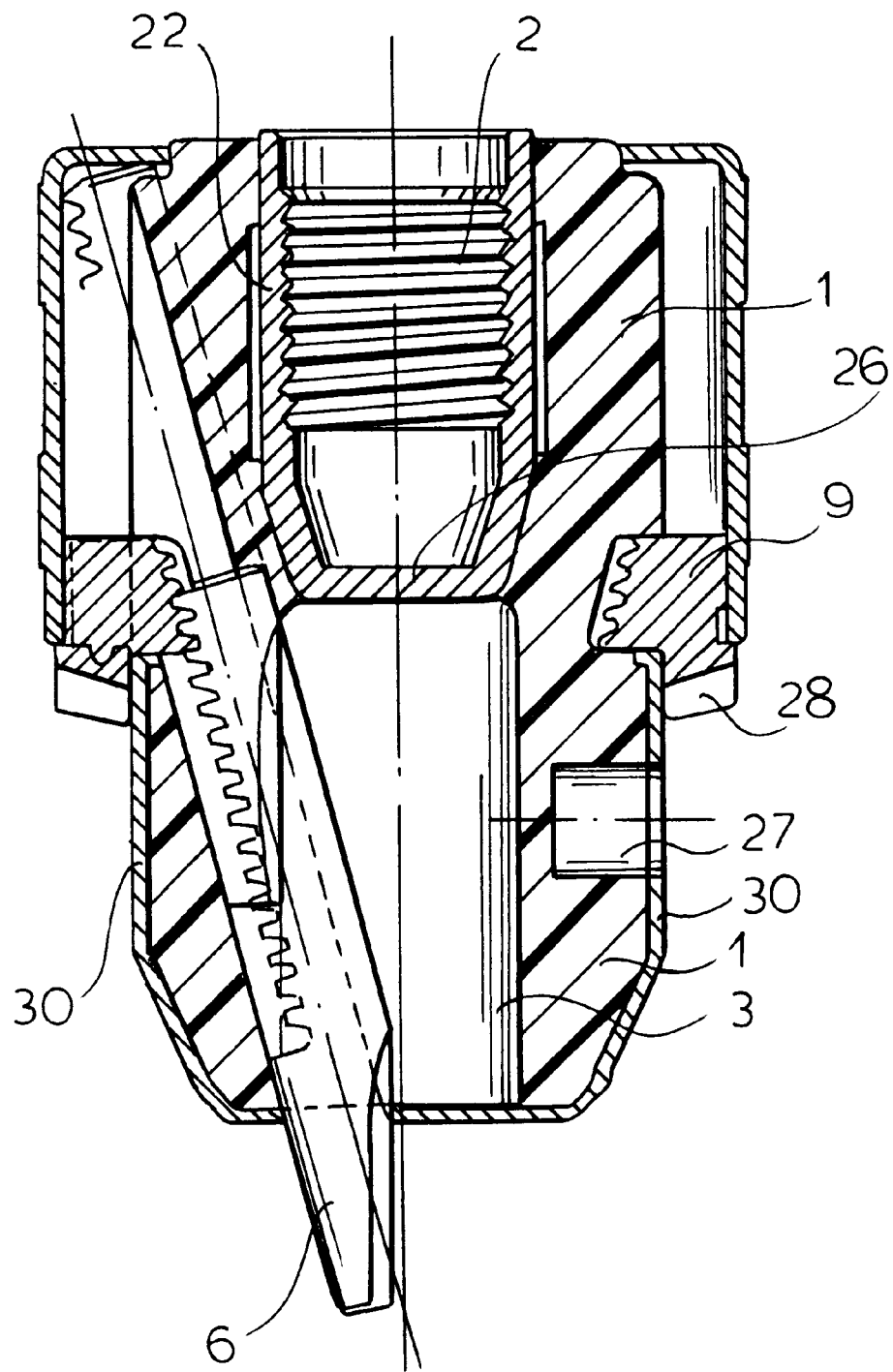
FIG. 20 is an axial section through an eleventh embodiment of the chuck.

In FIG. 20 the front end of the body 1 is closely surrounded by a metal jacket 30 as in FIGS. 3 and 4. The jacket 30 thus reinforces the hole 27. Here also the reinforcement element 22 is formed as an internally threaded cup whose base 26 is a partition between the two holes 2 and 3.

Figure 21:
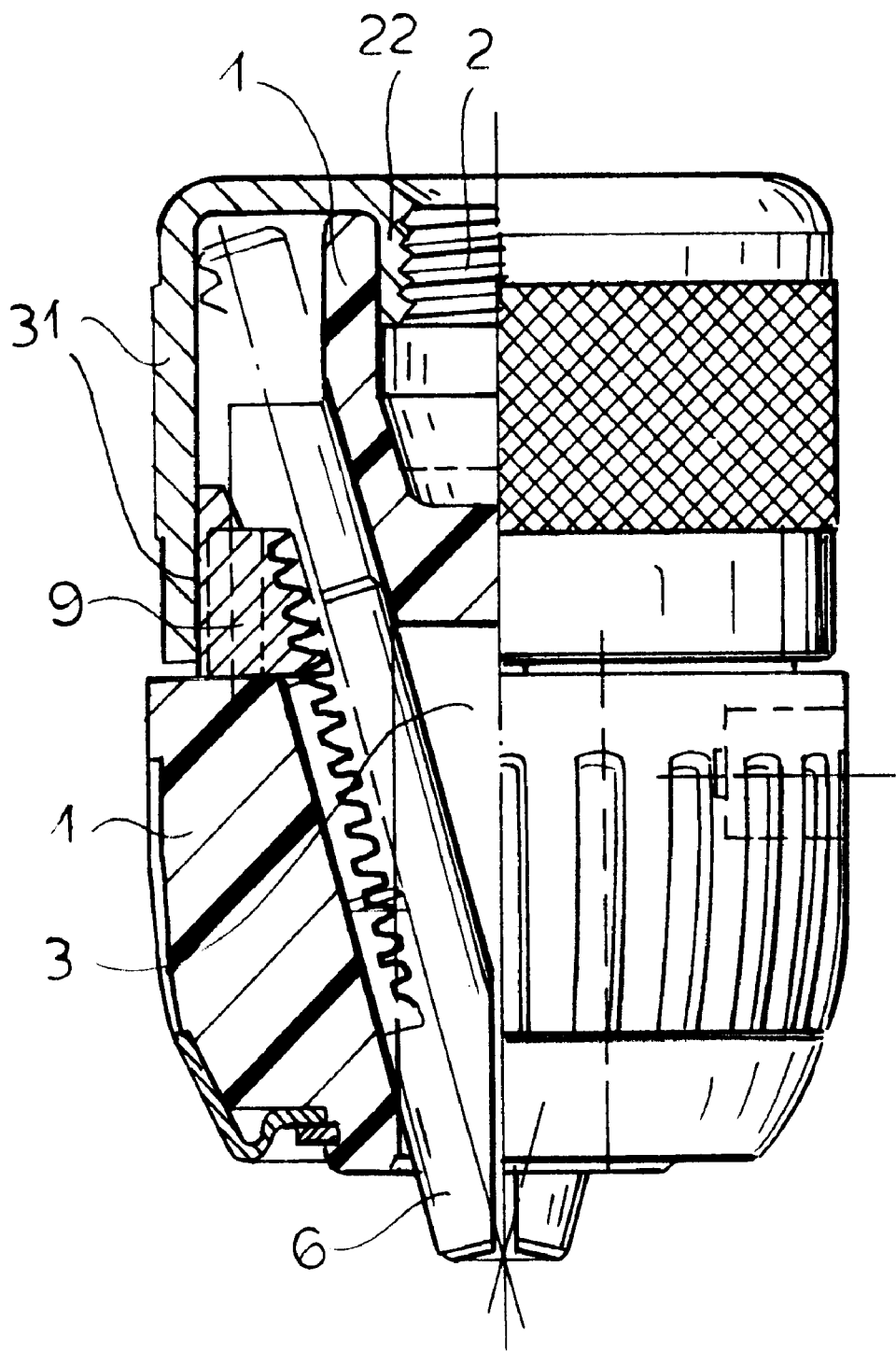
FIG. 21 is an axial section through a twelfth embodiment of the chuck.

The reinforcement element 22 in FIG. 21 is extended out over the rear end and down the sides of the body 1 as a skirt 31. The passages 4 are formed in the body 1 which here is rotatable relative to the reinforcement element 22 that is fixed to the ring 9, so that rotation of the body 1 orbits the jaws 6 in the ring 9 and moves them in or out.

Figure 22:
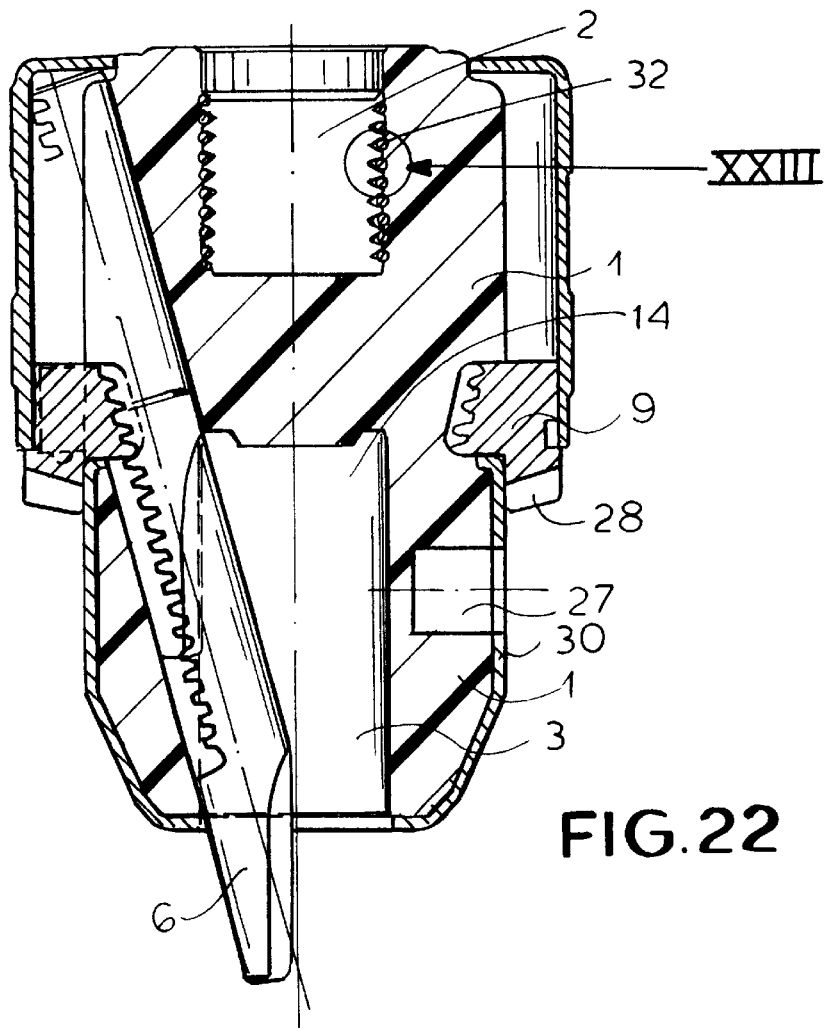
FIG. 22 is an axial section through a thirteenth embodiment of the chuck.
Figure 23:
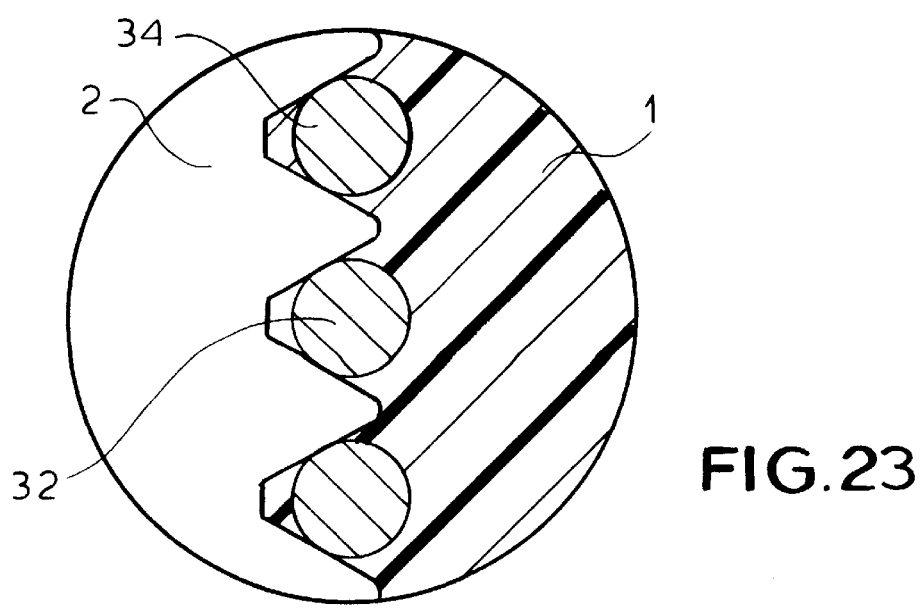
FIG. 23 is a large-scale view of the detail indicated at XXIII in FIG. 22.

The chuck of FIGS. 22 and 23 has a screwthread 32 reinforced with a spiral steel wire 34 that is imbedded in the plastic of the body 1. Here the wire 34 is of circular section.

Figure 24:
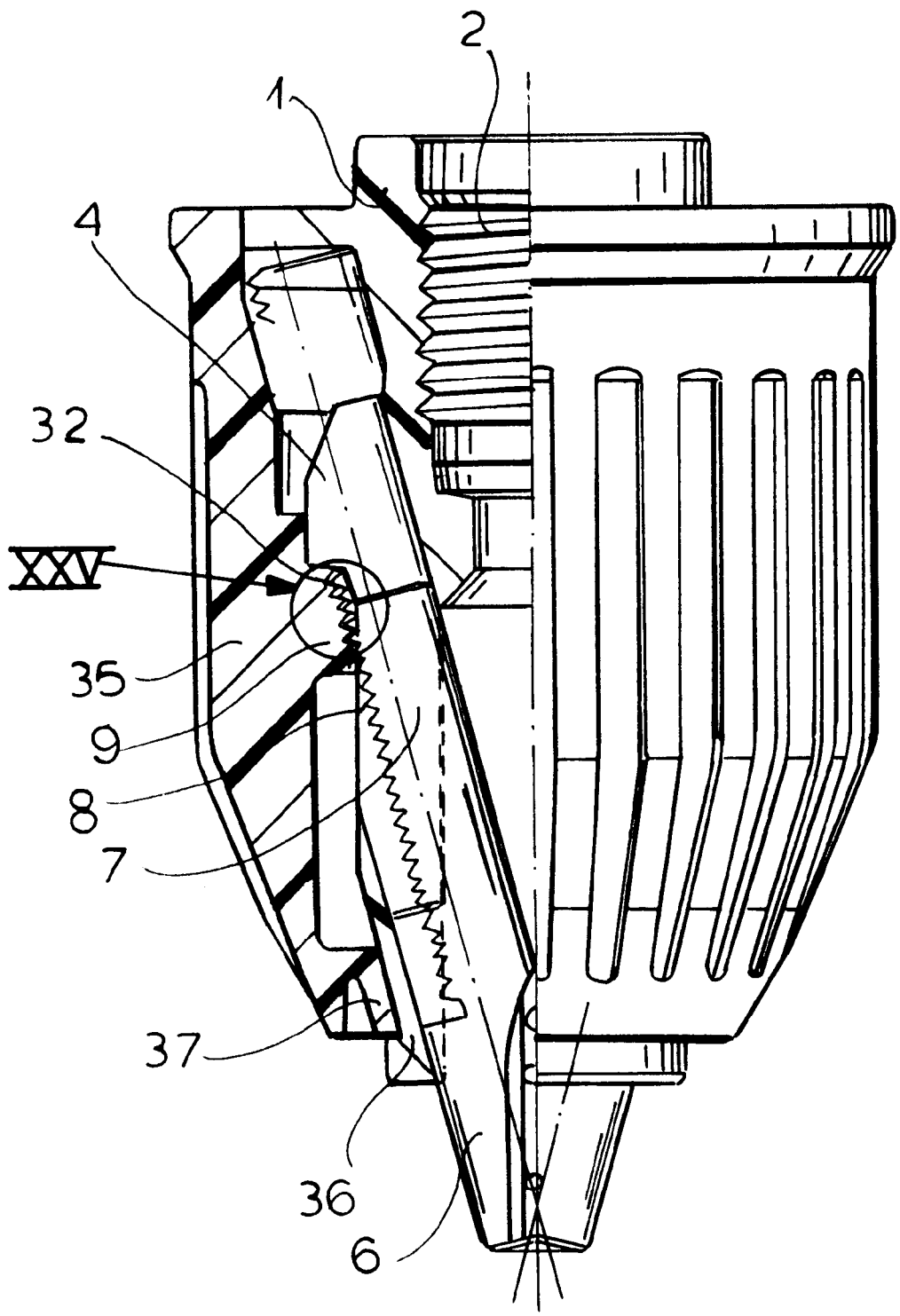
FIG. 24 is an axial section through a fourteenth embodiment of the chuck.
Figure 25B:
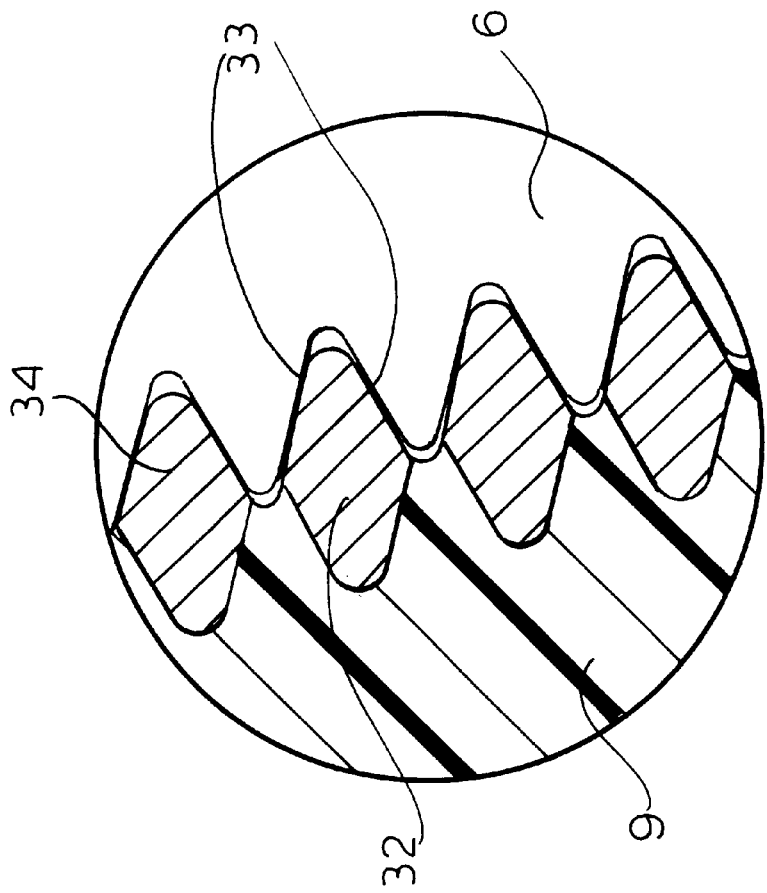
FIG. 25b is a view like FIG. 25a showing a variant on that structure.
Figure 25A:
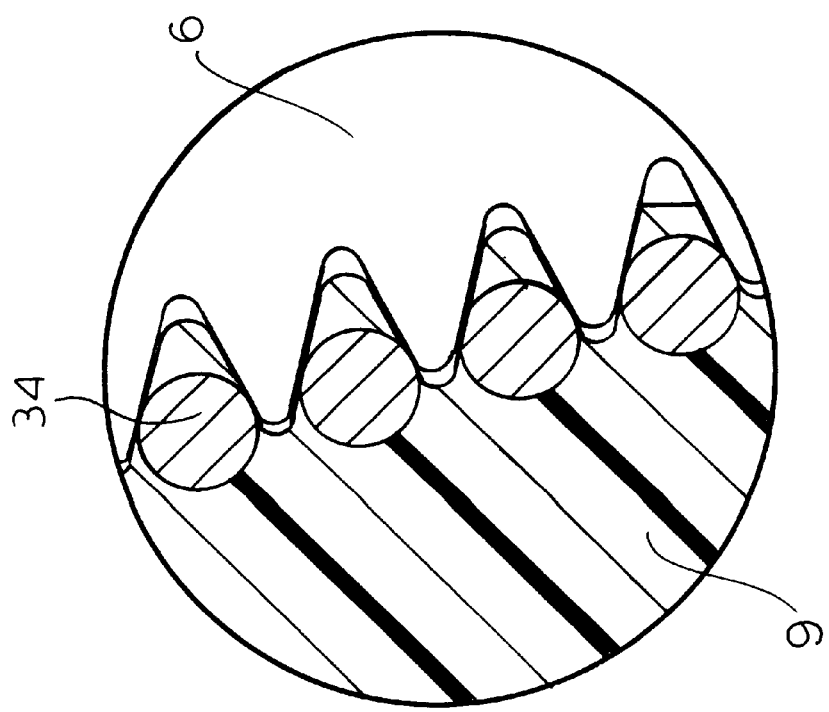
FIG. 25a is a large-scale view of the detail indicated at XXV in FIG. 24.

In FIGS. 24 and 25a a similar system is used, but here the screwthread 32 is formed in an outer sleeve 35 which itself is unitarily formed with the ring 9. This sleeve 35 has at its front end a flexible lip 37 that snaps behind a shoulder 36 of the body 1. The teeth 8 of the jaw shanks 7 mesh with the screwthread 32 having the reinforcement wire 34. FIG. 25b shows how the wire 34 can be of rhombic shape so that it is fully exposed and in effect forms flanks 33 of the screwthread 32.

Figure 26:
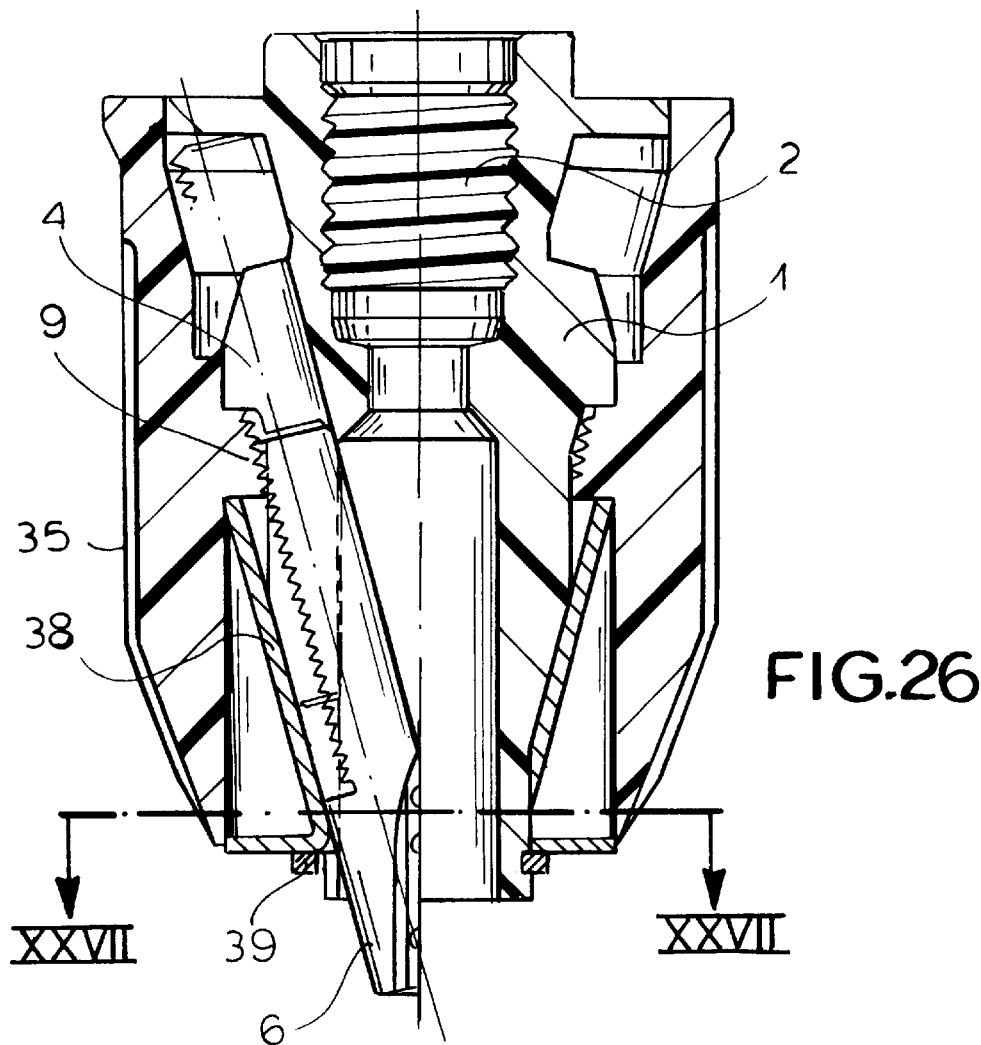
FIG. 26 is an axial section through a fifteenth embodiment of the chuck.
Figure 27:
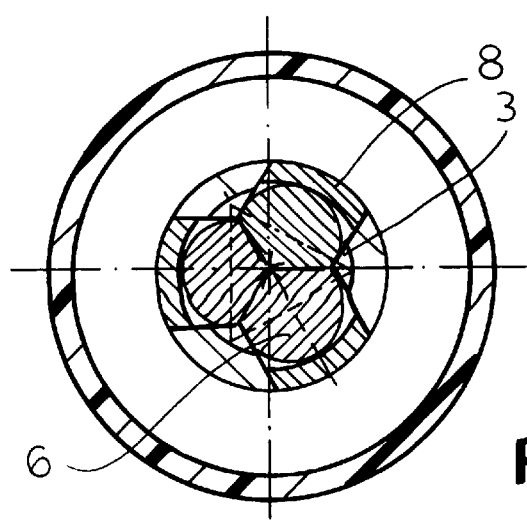
FIG. 27 is a section taken along line XXVII—XXVII of FIG. 26.
Figure 28:
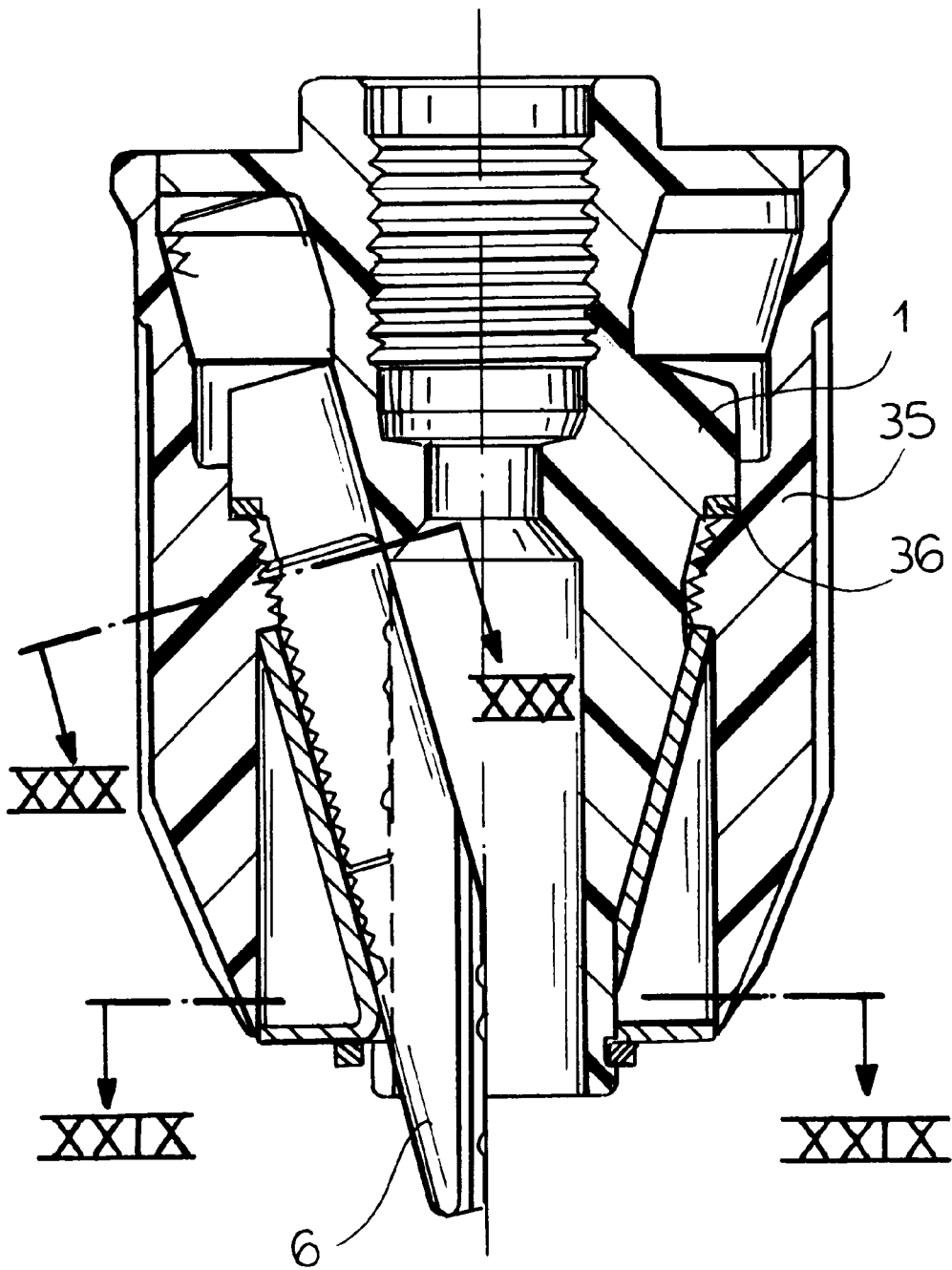
FIG. 28 is an axial section through a sixteenth embodiment of the chuck.

FIGS. 26 and 27 show an arrangement where the passages 4 are formed as outwardly open slots in the body 1, closed by a frustoconical wall of a sheet-metal reinforcement element 38 secured in place on the end of the body 1 by a snap ring 39. Such a body 1 can be made by a three-part mold in a very economical manner. The system of FIGS. 28 and 29 is identical to that of FIGS. 26 and 27, except that a wear ring 36 is provided between the parts 1 and 35. FIGS. 30a, 30b, and 30c show how the jaws 6 can be, respectively, of square, triangular, or pentagonal section.

Figure 31:
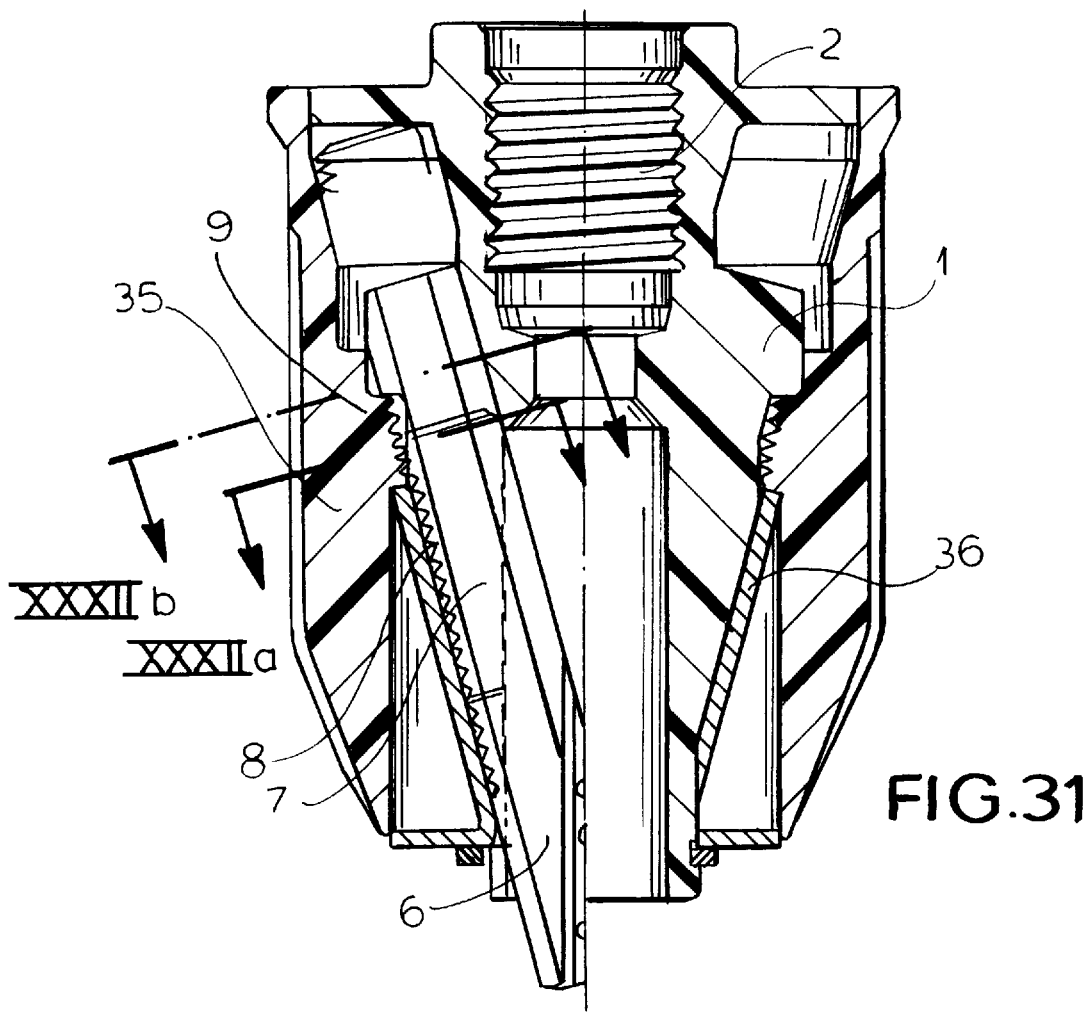
FIG. 31 is an axial section through a seventeenth embodiment of the chuck.
Figure 32B:
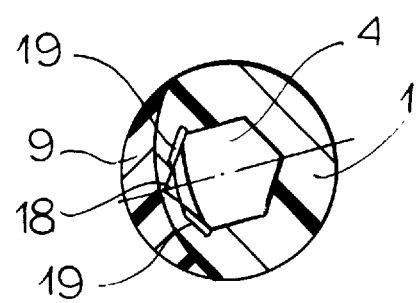
FIGS. 32a and 32b are sections taken respectively along lines XXXIIa—XXXIIa and XXXIIb—XXXIIb of FIG. 31.
Figure 32A:
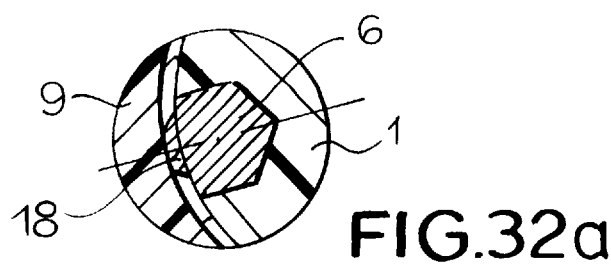
Figure 33:
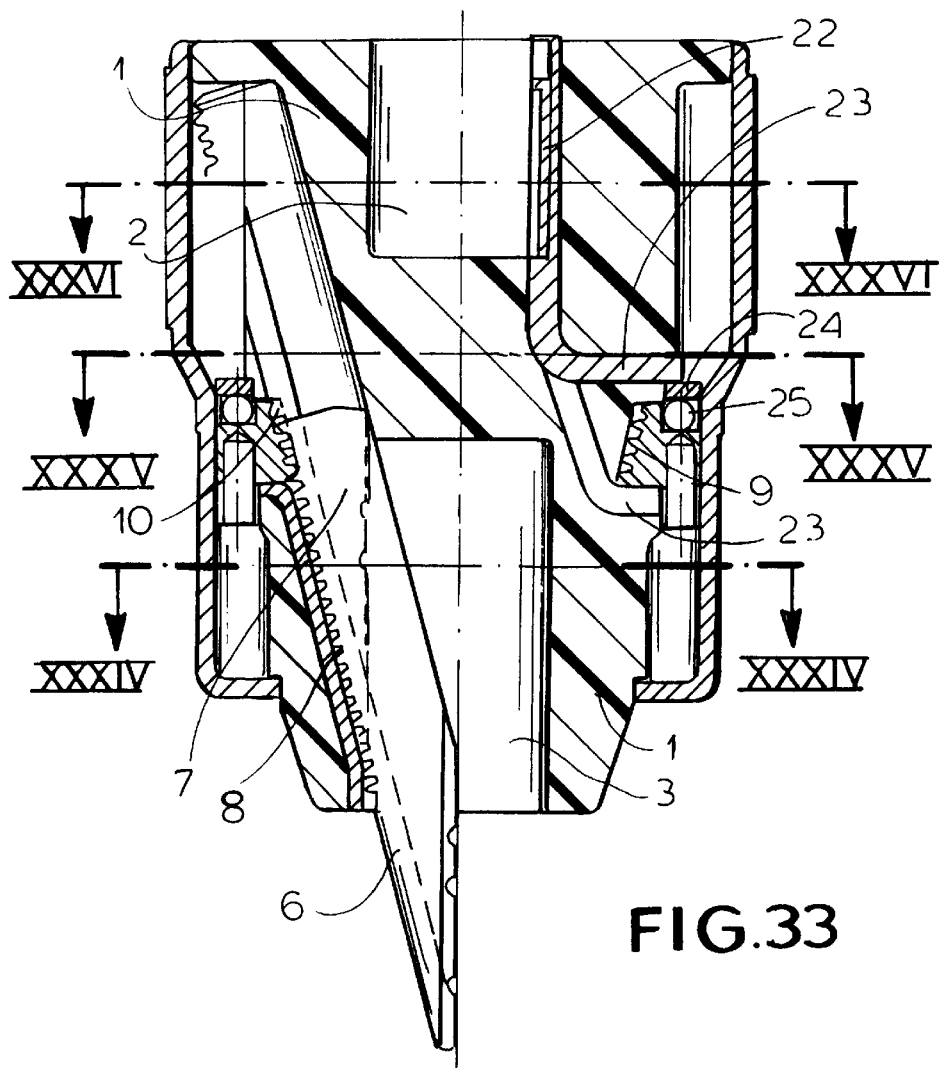
FIG. 33 is an axial section through an eighteenth embodiment of the chuck.
Figure 34:
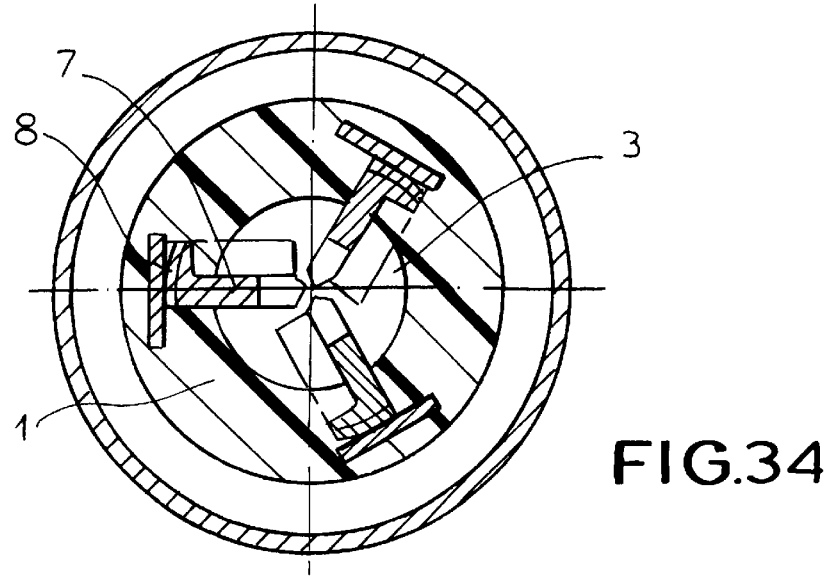
FIGS. 34, 35, and 36 are sections taken along respective lines XXXIV—XXXIV, XXXV—XXXV, and XXXVI—XXXVI of FIG. 33.
Figure 35:
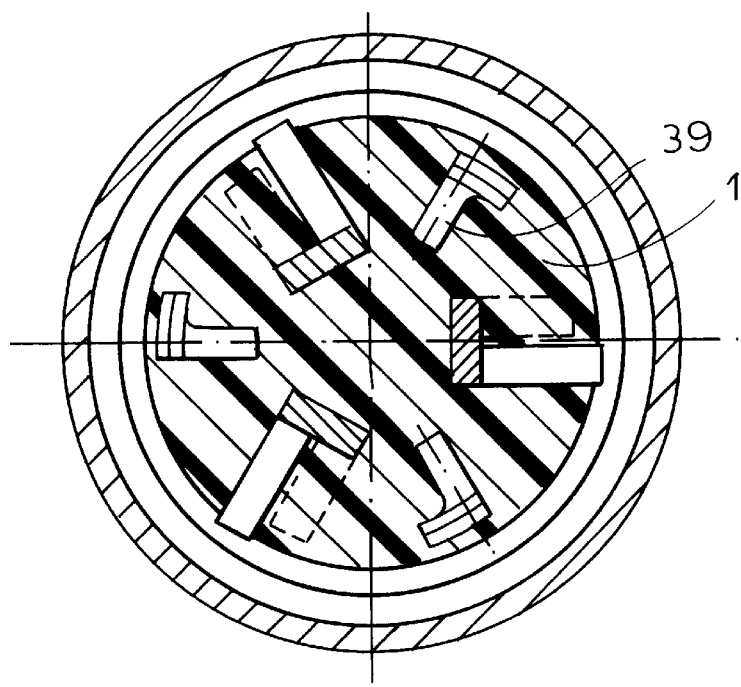
Figure 36:
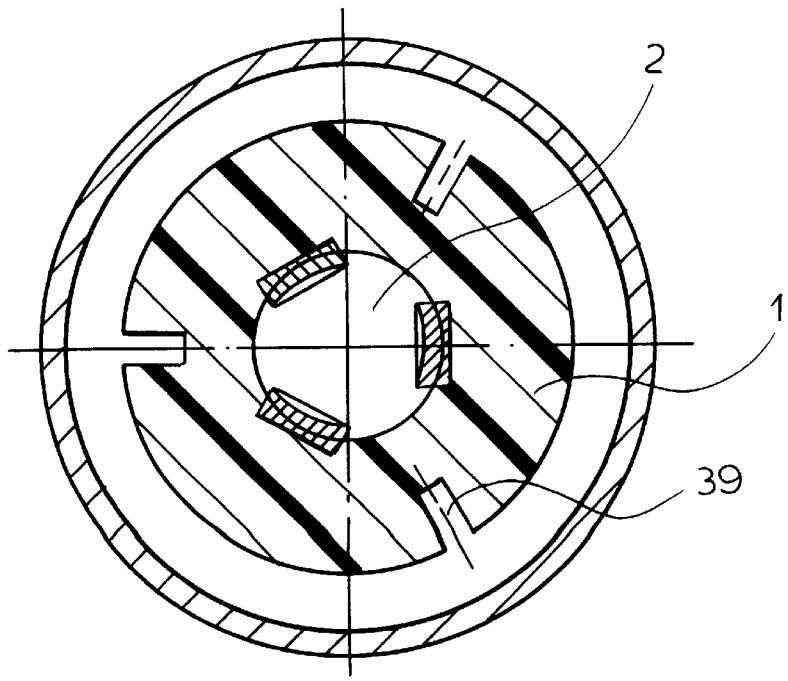

The structure of FIGS. 31, 32a, and 32b is an amalgam of the system of FIGS. 24–30c and FIGS. 8–11. Here, however, the teeth 8 are turned outward and the ring 9 is unitarily formed with the sleeve 35, but again the passages 4 have side faces 18 formed with grooves 19 that can accommodate protruding parts formed when the teeth 8 are stamped into the jaws 6.

In FIGS. 33–36 the metallic jaws 6 are of L-section and fit in complementary L-section passages 4 with flat shanks 39 extending radially of the chuck axis. In addition the flange fingers 23 of the metallic reinforcement element 22 sit directly atop a back race 24 of a ball bearing 25 that engages the ring 9. Furthermore other fingers 23 of the element 22 engage forward of the ring 9, forming the front flank of the groove 10. During drilling most of the force effective on the jaws 6 is transmitted back through the ring 9 to the body 1, so this structure reduces wear in these elements.

What is claimed is:

1. A drill chuck comprising:
   a body element formed of plastic reinforced with glass and carbon fibers and provided with an imbedded metallic reinforcement element, centered on and rotatable about an axis, and formed centered on the axis with a rearwardly open spindle hole and a forwardly open tool hole, the tool hole being formed in the metallic reinforcement element;
   a ring element axially fixed but rotatable about the axis on the body element, one of the elements being formed with a plurality of angled guide passages opening axially forward into the tool hole and the other of the elements being formed centered on the axis with a screwthread exposed in the passages; and respective jaws axially and radially displaceable in the passages and each formed with a row of teeth meshing with the screwthread, whereby rotation of the ring element in one direction displaces the jaws toward one another and opposite rotation displaces them away from one another.

2. The drill chuck defined in claim 1 wherein the glass-fiber content is between 5% and 35%.

3. The drill chuck defined in claim 1 wherein the carbon-fiber content is between 5% and 25%.

4. The drill chuck defined in claim 1 wherein the fibers are nonuniformly distributed in the plastic.

5. The drill chuck defined in claim 1 wherein the ring element is also formed of fiber-reinforced plastic and is formed with the guide passages, the screwthread being formed on the body.

6. The drill chuck defined in claim 1 wherein each of the guide passages is formed with a longitudinally extending inwardly projecting ridge and each of the jaws is formed with a complementary groove.

7. The drill chuck defined in claim 1 wherein each of the guide passages is formed with a longitudinally extending chip-draining groove.

8. The drill chuck defined in claim 7 wherein the chuck body is formed at a base of the tool hole with an annular chip-catching groove communicating with the chip-draining grooves of the passages.

9. The drill chuck defined in claim 1 wherein the passages and jaws are of complementary noncircular cross section.

10. The drill chuck defined in claim 1 wherein the passages and jaws are of complementary polygonal cross section.

11. The drill chuck defined in claim 1 wherein the spindle hole is of polygonal section.

12. The drill chuck defined in claim 11 wherein the body is formed with a crosswise passage traversing the spindle hole, the chuck further comprising a pin received in the crosswise passage and anchoring a spindle in the spindle hole.

13. The drill chuck defined in claim 1 wherein the element is a sleeve lining the spindle hole.

14. The drill chuck defined in claim 13 wherein the sleeve has an axially extending skirt projecting axially forward and largely surrounding the body.

15. The drill chuck defined in claim 1, further comprising a spiral metal wire imbedded in and reinforcing the screwthread.

16. The drill chuck defined in claim 15 wherein the wire is exposed at flanks of the screwthread.

17. The drill chuck defined in claim 16 wherein the wire has flat sides forming the flanks of the screwthread.

18. The drill chuck defined in claim 1 wherein the body is formed with the passages and with a key-anchor hole, the ring being formed with teeth adapted to mesh with a gear of a key inserted in the key-anchor hole, the body being provided with an embedded metallic reinforcement at the key-anchor hole.

19. The drill chuck defined in claim 1, further comprising a metallic jacket closely surrounding a front end of the body.

20. The drill chuck defined in claim 1 wherein the ring element is also formed of fiber-reinforced plastic.

21. The drill chuck defined in claim 1 wherein the ring element is formed with a forwardly directed elastically deflectable lip, the body having a shoulder engageable through and forward of the lip to retain the element on the body.

22. The drill chuck defined in claim 1 wherein the passages are formed in the plastic of the body and the body is provided with a metallic cover sleeve radially outwardly closing the passages.

23. A drill chuck comprising:

a body element formed of fiber-reinforced plastic, centered on and rotatable about an axis, and formed centered on the axis with a rearwardly open spindle hole and a forwardly open tool hole;

a ring element axially fixed but rotatable about the axis on the body element, one of the elements being formed with a plurality of angled guide passages opening axially forward into the tool hole and the other of the elements being formed centered on the axis with a screwthread exposed in the passages; and respective jaws axially and radially displaceable in the passages and each formed with a row of teeth meshing with the screwthread, whereby rotation of the ring element in one direction displaces the jaws toward one another and opposite rotation displaces them away from one another, the passages and jaws being of complementary polygonal cross section, the teeth being formed at a corner of the respective jaw and having a width smaller than a maximum width of the respective jaw.

24. The drill chuck defined in claim 23 wherein the jaws are made of plastic.

25. The drill chuck defined in claim 23 wherein the teeth are stamped into the respective jaws, whereby material is pressed from faces of the jaws at ends of the teeth, the passages being formed with longitudinal inwardly open grooves accommodating the material pressed from the respective jaws.

26. A drill chuck comprising:

a body element formed of fiber-reinforced plastic, centered on and rotatable about an axis, formed centered on the axis with a rearwardly open spindle hole and a forwardly open tool hole, provided with an imbedded metallic reinforcement sleeve lining the spindle hole, and formed with a radially outwardly open groove receiving the ring, the element having a flange forming a back flank of the groove;

a ring element axially fixed but rotatable about the axis on the body element, one of the elements being formed with a plurality of angled guide passages opening axially forward into the tool hole and the other of the elements being formed centered on the axis with a screwthread exposed in the passages; and respective jaws axially and radially displaceable in the passages and each formed with a row of teeth meshing with the screwthread, whereby rotation of the ring element in one direction displaces the jaws toward one another and opposite rotation displaces them away from one another.

* * * * *